Feb. 22, 1927.
E. CHESHIRE
1,618,170
COMPOSING ROOM SAW
Filed Sept. 15, 1923
2 Sheets-Sheet 1
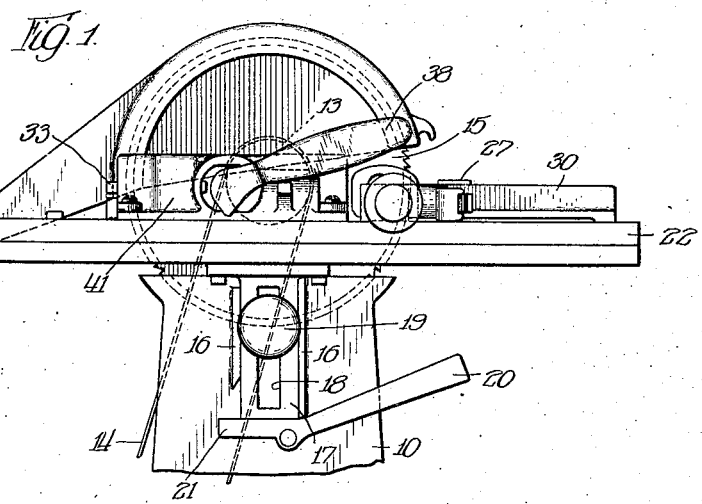
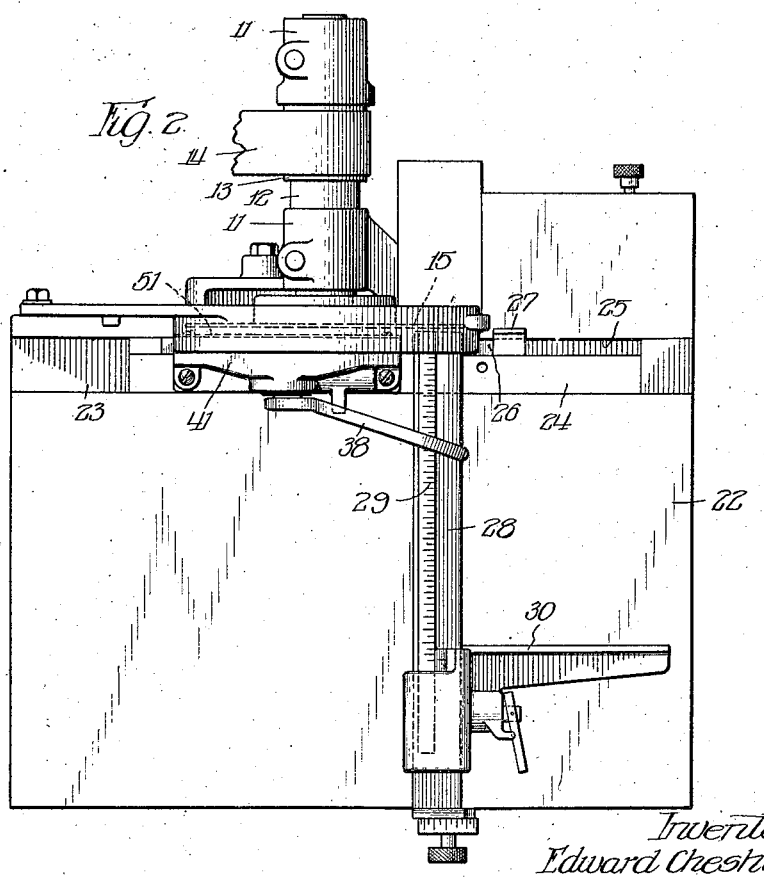
Witness:
G. Burkhardt
Inventor:
Edward Cheshire,
By Wilkinson, Huxley, Byron + Knight
Attys

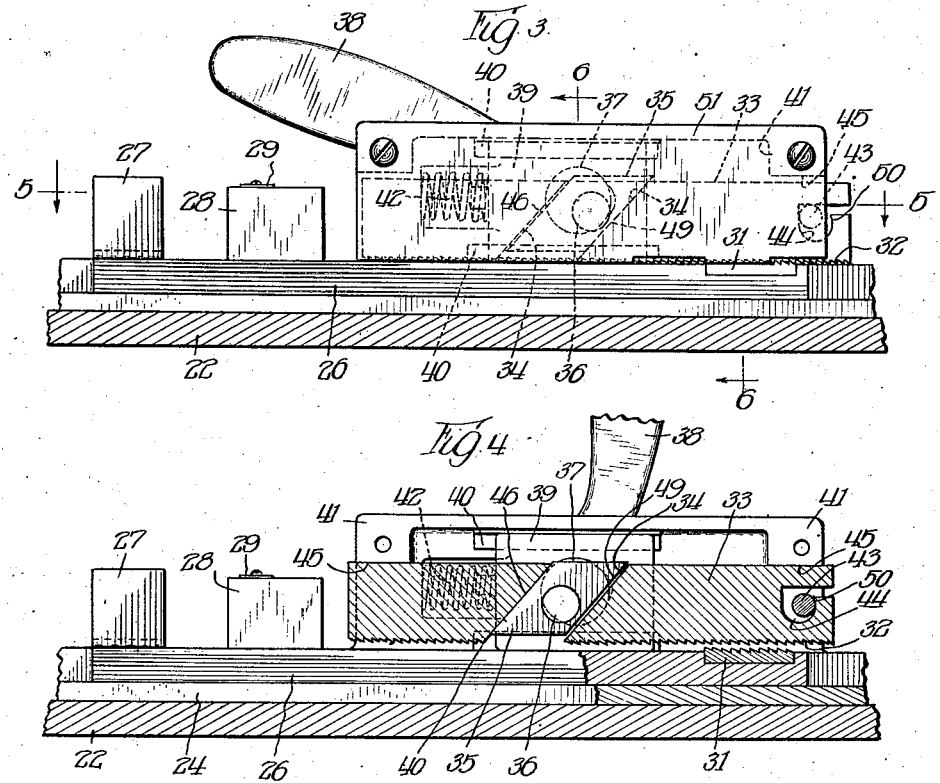
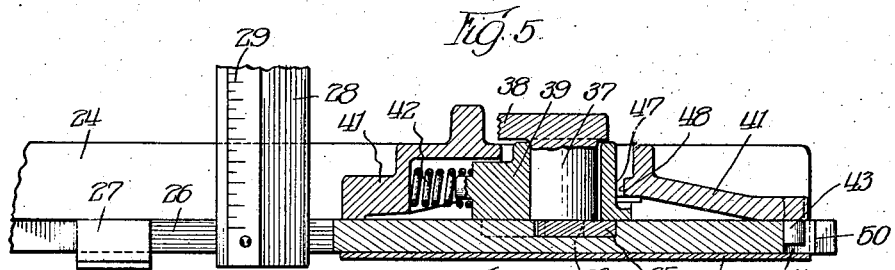
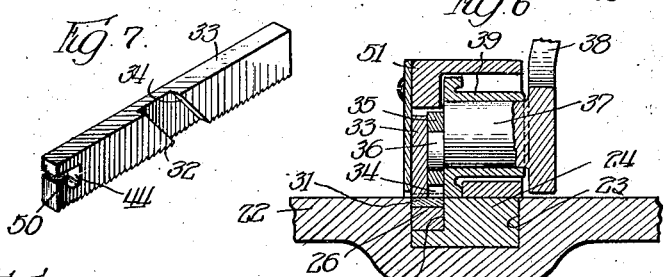

Patented Feb. 22, 1927.

1,618,170

UNITED STATES PATENT OFFICE.

EDWARD CHESHIRE, OF BERLIN TOWNSHIP, WAUKESHA COUNTY, WISCONSIN.

COMPOSING-ROOM SAW.

Application filed September 15, 1923. Serial No. 662,840.

This invention relates to a composing room saw and more particularly to means for clamping line-o-type slugs, borders, cuts or electroplates and the like.

One object of the invention is to provide an improved simple, durable and efficient work clamping device for composing room saws.

Another object is to provide a composing room saw work-clamping device which is positive in action and adapted to meet the various requirements for successful commercial use.

These and other objects are accomplished by means of the arrangement disclosed on the accompanying sheets of drawings, in which—

Figure 1 is a fragmentary side elevation of a composing room saw embodying my invention;

Figure 2 is a top plan view of the same mechanism;

Figure 3 is an enlarged detail side elevation of my improved work-clamping means, supporting table being shown in section, and a movable member of the clamp being held in work clamping position;

Figure 4 is a somewhat similar view showing more of the parts in section and also showing the clamp holding member locked in its upper position whereby the long slide portion of the relatively movable clamping jaw is free to be moved preparatory to the placing of work in the clamp;

Figure 5 is a sectional view taken in the plane of line 5—5 of Figure 3;

Figure 6 is a sectional view taken in the planes of irregular lines 6—6 of Figure 3; and Figure 7 is a perspective view of the clamp holding means.

The various novel features of the invention will be apparent from the following description and drawings and will be particularly pointed out in the appended claims.

Referring to the drawings, it will be noted that my invention is disclosed in connection with a composing room saw including a cored tubular standard 10 upon one upper side portion of which are mounted horizontal bearings 11 having a shaft 12 journaled therein. The shaft between the bearings is provided with a pulley 13 which is driven through any suitable belt 14. The inner end of the shaft which terminates above a portion of the standard has mounted thereon a circular saw 15.

The side of the standard 10 opposite bearings 11 is formed with vertically extending guide ribs 16 between which is positioned a supporting bracket 17 having a vertically extending slot 18. A thumb bolt 19 extending through the slot and threaded into the standard 10 adjustably secures the bracket on the standard. A lever 20 having its shorter end 21 extending beneath the lower end of the bracket 17 is fulcrumed on the standard and is adapted to adjust the vertical position of the bracket thereon when the thumb screw is loosened. A horizontally extending table 22 is mounted firmly upon the bracket 17 and is shaped to extend in part on both sides of the saw. By means of this arrangement the table may be retained in its lower position for sawing and trimming the work or material, or raised to a position for sawing without trimming, as is well understood in the art. This table in its upper surface is provided with an elongated guide groove 23 of rectangular form in cross-section which extends adjacent to and parallel with the outer side face of the saw 15.

Within the guide groove 23 is positioned a slidable work holding member 24 which is formed with a recessed portion 25 in which is slidably mounted a shank 26 of a relatively movable clamping jaw member 27. While the member 27 forms a relatively movable clamping jaw, the relatively stationary clamping jaw 28 is in the form of a bar which is secured to and movable with the main slide member 24. Both of the slides 24 and 26 are slidably mounted within the groove 23 of the table 22 and preferably have their upper portions flush with the top of the table or, in other words, both are located below the clamp bar or jaw 28 for facilitating accurate clamping, sawing and trimming of material which is clamped between the jaw members 27 and 28.

Before describing in detail the clamping mechanism which forms the real essence of this invention, it might be well to mention in passing that the upper surface of the fixed clamping jaw 28 is formed with, or has mounted thereon, a graduated scale 29 and is provided with an adjustable side gage arm 30 whereby material to be treated may be accurately positioned preparatory to being clamped. It will be understood that the material to be treated will be clamped between the jaws 27 and 28 and will rest upon the table 22 and that the material clamped between said jaws 27 and 28, as a unit, will be moved longitudinally of the table during normal use of the composing room saw.

This invention has to do primarily with a clamping mechanism which will now be described in detail. As mentioned above the relatively movable clamping jaw 27 has a longitudinally extending shank or slide 26 which is slidably mounted within the slide member 24. This shank is provided with a tooth member 31 which cooperates with operatively associated teeth 32 formed on the under side of the locking or clamp holding member 33. As shown in Figure 3 of the drawings, the teeth 31 and 32 are in engagement and as a matter of fact forcibly held in engagement for positively positioning and holding the relatively movable jaw with respect to the relatively stationary jaw and more particularly for clamping material between said jaws. This holding member 33 is locked in such clamp holding position by means which will be described hereinafter. As shown in Figure 4 this same holding member 33 is locked in its other limiting position out of engagement with the tooth member 31 to permit adjustment of the relatively movable jaw member 27 with respect to its associated jaw member 28. In other words, the clamp holding member 33 may be locked in two positions, one its lower clamping position and the other its upper non-clamping position.

In connection with the actuation and locking of the clamp holding member 33, attention is directed to the fact that said member is provided with an upwardly and forwardly extending slot 34 as viewed particularly in Figures 3 and 4, which slidably receives a cam member 35 which in turn is actuated through a pin or projection 36 eccentrically mounted or formed with respect to a trunnion 37 preferably integrally formed with a hand clamping lever 38. The trunnion 37 is mounted with a sliding bearing 39 guidedly slidably mounted on guides 40 within a casing 41 secured to the slide member 24. A coil spring 42 is interposed between one inner wall of the casing 41 and one end of the sliding bearing 39 for the purpose of assisting in the clamping action, as will appear more clearly hereinafter. A pin 43 formed integrally with the casing 41 is received within an opening 44 in one end of the clamp holding member 33. This pin 43, cooperating with the walls of the slot 44, limits the downward and longitudinal movements of the clamp holding member 33 and the shoulders 45 of the casing 41 limit the upward movement of the clamp holding member 33.

Relative to the operation of the clamp holding member 33, reference will be had first to Figure 4 of the drawings in which it will be noted that the left-hand camming surface 46 is pressed into engagement with the left-hand wall of the diagonal slot 34 and that said cam has been forced upwardly through the action of the eccentrically mounted pin 36 to a point wherein the upper surface of the holding member is clamped against the shoulders 45 of the casing 41. It also will be observed that the lever 38 through which the eccentric pin 36 is actuated, is located to the right of the pivotal center of the trunnion 37 as viewed in Figure 4, so that the clamp holding member 33 is positively held or locked in its non-functioning position. The spring 42 at this time is pressing against the slide bearing 39 in one of its limiting positions in which one wall 47 of the slide bearing 39 is in engagement with a shoulder 48 on the casing 41.

To move the clamp holding member 33 from its upper locked position, as shown in Figure 4, to its lower locked position in which it locks the movable clamp jaw 27 in position, it is necessary to move the hand lever 38 in a counterclockwise direction from the position shown in Figure 4 to the position shown in Figure 3. During such movement of the hand lever, the eccentric 36 is moved in a counterclockwise direction downwardly through its lower central position and then upwardly to the position shown in Figure 3 and as a result of the pivotal connection between the eccentric 36 and the cam member 35, the cam 35 is moved downwardly carrying the wedge surface 46 out of engagement with the associated side of the slot 34. The cam then continues to be loose within the slot 34 until the eccentric 36 passes through its lower central position (during which time the clamp holding member 33 is permitted to lower itself by its own weight so that its teeth 32 pass into engagement with the teeth member 31) whereupon the right-hand surface 49 of the cam 35 is pressed into engagement with the associated side of the slot 34 and as a result thereof upon continued counterclockwise movement of the hand lever 38 clamp holding member 33 is given a longitudinal movement away from the fixed jaw 28 and carrying with it the relatively movable jaw member 27 for increasing the pressure with which the material between said jaws 27 and 28 is clamped. As the counterclockwise movement of the lever 38 is continued still further the cam surface 49 continues to ride upwardly on the associated wall of the slot 34 for forcing the clamp holding member 33 in the same direction until further longitudinal and downward movement of said clamp holding member 33 is arrested by the pin 43 engaging with the walls of the slot 44, as shown in Figure 3. Further counterclockwise movement of the hand lever 38 causes a rearward sliding movement of the slide bearing 39 in the opposite direction, compressing the spring 42 and spring locking the spring clamp holding member 33 in clamping position, as shown in Figure 3 of the drawings.

In releasing the material between the clamping jaws 27 and 28, the hand lever 38 is rotated in a clockwise direction from the position shown in Figure 3 to the position shown in Figure 4 and during such movement the slide bearing 39 is first permitted to move forwardly under the stored tension in spring 42 as the surface 49 of the cam 35 rides downwardly on the associated wall of slot 34. Further movement of the handle 38 in a clockwise direction loosens the cam member 35 in slot 34 and then the cam surface 46 of the cam 35 passes into engagement with the left-hand wall of the slot 34 forcing the clamp holding member 33 to the rear toward the stationary clamp 28 and simultaneously permitting actual movement of the movable clamping jaw 27 further away from the stationary clamping jaw 28, this rearward movement of the clamp holding member 33 continuing until the pin 43 engages the corner 50 of the slot 44, and then further movement of the hand lever 38 causes the wedge surface 46 to ride upwardly on the associated wall of slot 34 lifting the clamp holding member 33 into engagement with the shoulders 45 of the casing 41 where the clamp holding member is locked in inoperative position. The movable clamping jaw is then free to be adjusted preparatory to clamping other material to be treated. A cover plate 51 is secured to the casing 41 for enclosing the clamp holding member 33 and its associated actuating parts.

By means of this arrangement there is provided a clamping mechanism which is simple, efficient, reliable and positive and adapted to meet the various requirements of commercial use.

It is my intention to cover all modifications of the invention falling within the spirit and scope of the following claims.

I claim:

1. In a machine of the class described, means for clamping material to be treated, including a plurality of relatively movable jaws, a holding member for holding said jaws in clamping position, said holding member being adapted to be freed from said jaws whereby said jaws may be moved relative to each other independently of said holding member, said member having a diagonally extending groove therein, a cam movably mounted in said groove for transmitting movement to said holding member, and means for actuating said cam.

2. In a machine of the class described, means for clamping material to be treated, including a plurality of relatively movable jaws, a holding member for holding said jaws in clamping position, said holding member being adapted to be freed from said jaws whereby said jaws may be moved relative to each other independently of said holding member, said member having a diagonally extending groove therein, a cam movably mounted in said groove for transmitting movement to said holding member, and eccentric means for actuating said cam.

3. In a machine of the class described, means for clamping material to be treated, including a plurality of relatively movable jaws, a holding member for holding said jaws in clamping position, said member having a diagonally extending groove therein, a cam movably mounted in said groove for transmitting movement to said holding member, eccentric means for actuating said cam, a sliding bearing in which said eccentric means is mounted, and a spring cooperating with said slide bearing for locking the holding member in its holding position.

4. In a machine of the class described, means for clamping material to be treated, including a plurality of relatively movable jaws, a holding member for holding said jaws in clamping position, said holding member being adapted to be freed from said jaws whereby said jaws may be moved relative to each other independently of said holding member, means for positively moving said holding member into and out of holding position, and means for limiting movement of said holding member.

5. In a machine of the class described, means for clamping material to be treated, including a plurality of relatively movable jaws, a holding member for holding said jaws in clamping position and having a groove therein, said holding member being adapted to be freed from said jaws whereby said jaws may be moved relative to each other independently of said holding member, and a double-face cam cooperating with the walls of said groove for moving said holding member into holding position and out of holding position.

6. In a machine of the class described, means for clamping material to be treated, including a plurality of relatively movable jaws, a holding member for holding said jaws in clamping position and having a groove therein, said holding member being adapted to be freed from said jaws whereby said jaws may be moved relative to each other independently of said holding member, a double-face cam cooperating with the walls of said groove for moving said holding member into holding position and out of holding position, and an eccentric for actuating said cam.

7. In a machine of the class described, means for clamping material to be treated, including a plurality of relatively movable jaws, a holding member for holding said jaws in clamping position and having a groove therein, said holding member being adapted to be freed from said jaws whereby said jaws may be moved relative to each other independently of said holding member, and a cam movably mounted in said groove and having one surface for engaging one wall of said groove for actuating the holding member for holding said jaws in clamping position and another surface for engaging another wall of said groove for actuating said holding member into a non-functioning position to liberate one of said jaws.

8. In a machine of the class described, means for clamping material to be treated, including a plurality of relatively movable jaws, a holding member for holding said jaws in clamping position and having a groove therein, said holding member being adapted to be freed from said jaws whereby said jaws may be moved relative to each other independently of said holding member, and a cam movably mounted in said groove and having one surface for engaging one wall of said groove for actuating the holding member for holding said jaws in clamping position and another surface for engaging another wall of said groove for actuating said holding member into a non-functioning position to liberate one of said jaws, and an eccentric for actuating said cam.

9. In a machine of the class described, means for clamping material to be treated, including a plurality of relatively movable jaws, a holding member for holding said jaws in clamping position and having a groove therein, said holding member being adapted to be freed from said jaws whereby said jaws may be moved relative to each other independently of said holding member, a cam movably mounted in said groove and having one surface for engaging one wall of said groove for actuating the holding member for holding said jaws in clamping position and another surface for engaging another wall of said groove for actuating said holding member into a non-functioning position to liberate one of said jaws, an eccentric for actuating said cam, and means for limiting the movements of said holding member.

10. In a machine of the class described, means for clamping material to be treated, including a plurality of relatively movable jaws, a holding member for holding said jaws in clamping position and having a groove therein, a cam movably mounted in said groove and having one surface for engaging one wall of said groove for actuating the holding member for holding said jaws in clamping position and another surface for engaging another wall of said groove for actuating said holding member into a non-functioning position to liberate one of said jaws, an eccentric for actuating said cam member, a slide bearing in which said eccentric is mounted, and a spring cooperating with said slide bearing which becomes compressed when said holding member is pressed into a clamp holding position for yieldably locking said holding member in said position.

11. In a machine of the class described, means for clamping material to be treated including a plurality of relatively movable jaws, one of said jaws having a shank with a tooth portion, a holding member for holding said jaws in clamping position and having a tooth portion cooperating with said other tooth portion, said holding member having a groove therein, a cam having a plurality of surfaces cooperating with different walls of said groove for transmitting motion to said holding member for moving it into and out of holding position, a slide bearing, a trunnion pivotally mounted therein and having an eccentric projection pivotally connected to said cam for actuating the latter, and a spring associated with said slide bearing which is compressed when said tooth portions are pressed into engagement with each other for yieldably locking said toothed members in such relation.

Signed at Milwaukee, Wisconsin, this 12th day of September, 1923.

EDWARD CHESHIRE.